United States Patent
Bradley et al.

(10) Patent No.: US 10,283,143 B2
(45) Date of Patent: May 7, 2019

(54) ESTIMATING PITCH OF HARMONIC SIGNALS

(71) Applicant: Friday Harbor LLC, New York, NY (US)

(72) Inventors: David C. Bradley, La Jolla, CA (US); Jeremy Semko, San Diego, CA (US)

(73) Assignee: Friday Harbor LLC, New York, NY (US)

(*) Notice: Subject to any disclaimer, the term of this patent is extended or adjusted under 35 U.S.C. 154(b) by 66 days.

(21) Appl. No.: 15/463,930

(22) Filed: Mar. 20, 2017

(65) Prior Publication Data

US 2017/0294196 A1    Oct. 12, 2017

Related U.S. Application Data

(60) Provisional application No. 62/320,317, filed on Apr. 8, 2016.

(51) Int. Cl.
*G10L 25/90* (2013.01)
*G10L 15/02* (2006.01)
*G10L 25/03* (2013.01)

(52) U.S. Cl.
CPC ............. *G10L 25/90* (2013.01); *G10L 15/02* (2013.01); *G10L 25/03* (2013.01); *G10L 2025/906* (2013.01)

(58) Field of Classification Search
CPC .................................................... G10L 25/90
See application file for complete search history.

(56) References Cited

U.S. PATENT DOCUMENTS

| | | | | |
|---|---|---|---|---|
| 5,651,091 A | * | 7/1997 | Chen | G10L 19/08 704/223 |
| 5,745,871 A | * | 4/1998 | Chen | G10L 19/08 704/207 |
| 6,311,154 B1 | * | 10/2001 | Gersho | G10L 19/18 704/219 |
| 6,564,182 B1 | * | 5/2003 | Gao | G10L 25/90 704/207 |

(Continued)

OTHER PUBLICATIONS

Karimian, "Pitch Estimation and Tracking With Harmonic Emphasis on the Acoustic Spectrum," IEEE, 2015.*

(Continued)

*Primary Examiner* — Feng-Tzer Tzeng
(74) *Attorney, Agent, or Firm* — Sheppard Mullin Richter & Hampton LLP

(57) ABSTRACT

A time-varying pitch of a signal may be estimated by processing a sequence of frames of the speech signal. An estimated fractional chirp rate may be computed for each frame of the sequence of frames, and the estimated fractional chirp rates may be used to compute a pitch template for the sequence, where the pitch template indicates the time-varying pitch of the signal subject to a scale factor. A first pitch estimate for each frame of the sequence of frames may be computed by computing a scale factor and multiplying the pitch template by the scale factor. A second pitch estimate may be computed from the first pitch estimate by identifying peaks in the frequency representations using the first pitch estimates and fitting a parametric function to the peaks.

20 Claims, 11 Drawing Sheets

(56) References Cited

U.S. PATENT DOCUMENTS

| | | | | |
|---|---|---|---|---|
| 8,620,649 | B2* | 12/2013 | Gao | G10L 19/20 |
| | | | | 704/219 |
| 8,650,028 | B2* | 2/2014 | Su | G10L 19/09 |
| | | | | 704/219 |
| 2003/0088401 | A1 | 5/2003 | Terez | |
| 2004/0133424 | A1* | 7/2004 | Ealey | G10L 25/90 |
| | | | | 704/233 |
| 2005/0149321 | A1* | 7/2005 | Kabi | G10L 25/90 |
| | | | | 704/207 |
| 2011/0213612 | A1 | 9/2011 | Zakarauskas | |
| 2012/0243705 | A1* | 9/2012 | Bradley | G10L 19/00 |
| | | | | 381/94.4 |
| 2016/0099012 | A1* | 4/2016 | Bradley | G10L 21/0264 |
| | | | | 704/207 |

OTHER PUBLICATIONS

Kepesi and Weruaga, "Adaptive chirp-based time-frequency analysis of speech signals," Speech Communication, May 2006.*
Notification of Transmittal of the International Search Report and the Written Opinion of the International Searching Authority, International Application No. PCT/US2017/026432, dated Sep. 7, 2017, 8 pages.

* cited by examiner

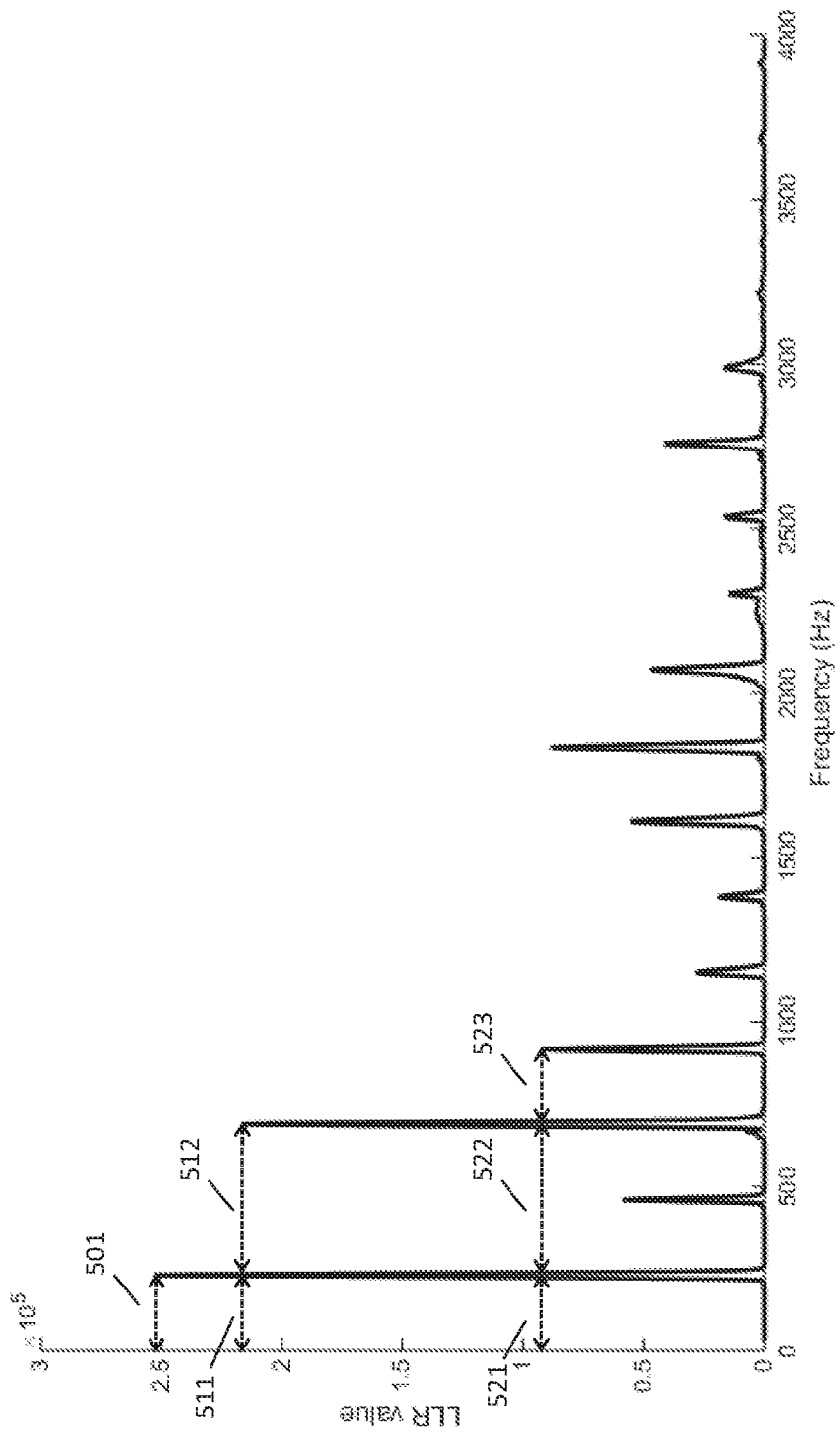

ESTIMATING PITCH OF HARMONIC SIGNALS

CLAIM OF PRIORITY

This patent application claims the benefit of the following provisional patent application, which is hereby incorporated by reference in its entirety: U.S. Patent Application Ser. No. 62/320,317, filed on Apr. 8, 2016.

BACKGROUND

A harmonic signal may have a fundamental frequency and one or more overtones. Harmonic signals include, for example, speech and music. The fundamental frequency may be referred to as the first harmonic. A harmonic signal may include other harmonics that may occur at multiples of the first harmonic. For example, if the fundamental frequency is f at a certain time, then the other harmonics may have frequencies of 2f, 3f, and so forth.

The pitch of a harmonic signal is the frequency of the first harmonic. Because of the relationship between the harmonics, the pitch is also the distance in frequency between adjacent signals. For some harmonic signals, such as those with a low signal to noise ratio, the pitch of the harmonic signal may be difficult to estimate. For example, where the first harmonic of the signal is not visible, the pitch may be erroneously estimated as the frequency of the second harmonic, or twice the value of the actual pitch. Such an error may be referred to as an octave error.

The pitch of a harmonic signal may be used in a variety of applications. For example, for speech signals, the pitch may be used for speech recognition, signal reconstruction, and speaker recognition. Accordingly, techniques for accurately estimating the pitch of a harmonic signal may improve the performance of applications that use an estimated pitch.

BRIEF DESCRIPTION OF THE FIGURES

The invention and the following detailed description of certain embodiments thereof may be understood by reference to the following figures:

FIG. 5B illustrates peak-to-peak distances for multiple thresholds in an LLR spectrum of a speech signal.

DETAILED DESCRIPTION

Described herein are techniques for estimating the pitch of a harmonic signal as it changes over time. For example, the pitch of a voice or the note of a musical instrument may change over time. In some implementations, the pitch of a harmonic signal may be estimated at regular intervals, such as every 10 milliseconds. The estimated pitch may then be used for other processing of the harmonic signal, such as performing automatic speech recognition or speaker verification or identification. The pitch may also be used to perform a signal reconstruction to reduce the noise level of the harmonic signal.

The relationship between the harmonics of a harmonic signal may be used to improve the estimation of the pitch of the harmonic signal. For example, if the first harmonic of a harmonic signal has a frequency of f and a chirp rate of c, then it is expected that the higher harmonics have frequencies at multiples of f and chirp rates at multiples of c. Techniques that take advantage of these relationships may, in some implementations, provide better results than other techniques.

The pitch of a harmonic signal corresponds to the frequency of the first harmonic. For some harmonic signals, the first harmonic may not be present or not visible (e.g., may be covered by noise), and the pitch may be determined from a frequency difference between the second and third harmonics (or other adjacent harmonics). For some harmonic signals, multiple harmonics may be present or not visible, and the pitch may be determined from the frequencies of the visible harmonics.

As the pitch of a harmonic signal changes, each of the harmonics will have a chirp rate that may vary over time, and the chirp rate of each harmonic may be different. The rate of change of the pitch may be referred to as pitch velocity or described by a fractional chirp rate. In some implementations, the fractional chirp rate may by computed as $\chi = c_n/f_n$ where $\chi$ represents the fractional chirp rate, $c_n$ represents the chirp rate of the nth harmonic, and $f_n$ represents the frequency of the $n^{th}$ harmonic.

In some implementations, it may be desired to compute the pitch of a harmonic signal at regular intervals. For example, it may be desired to compute the pitch every 10 milliseconds by performing computations on a portion of the signal that may be obtained by applying a window (e.g., a Gaussian, Hamming, or Hann window) to the signal. Successive portions of the signal may be referred to as frames, and frames may overlap. For example, frames may be created every 10 milliseconds and each frame may be 50 milliseconds long.

Figure 1:
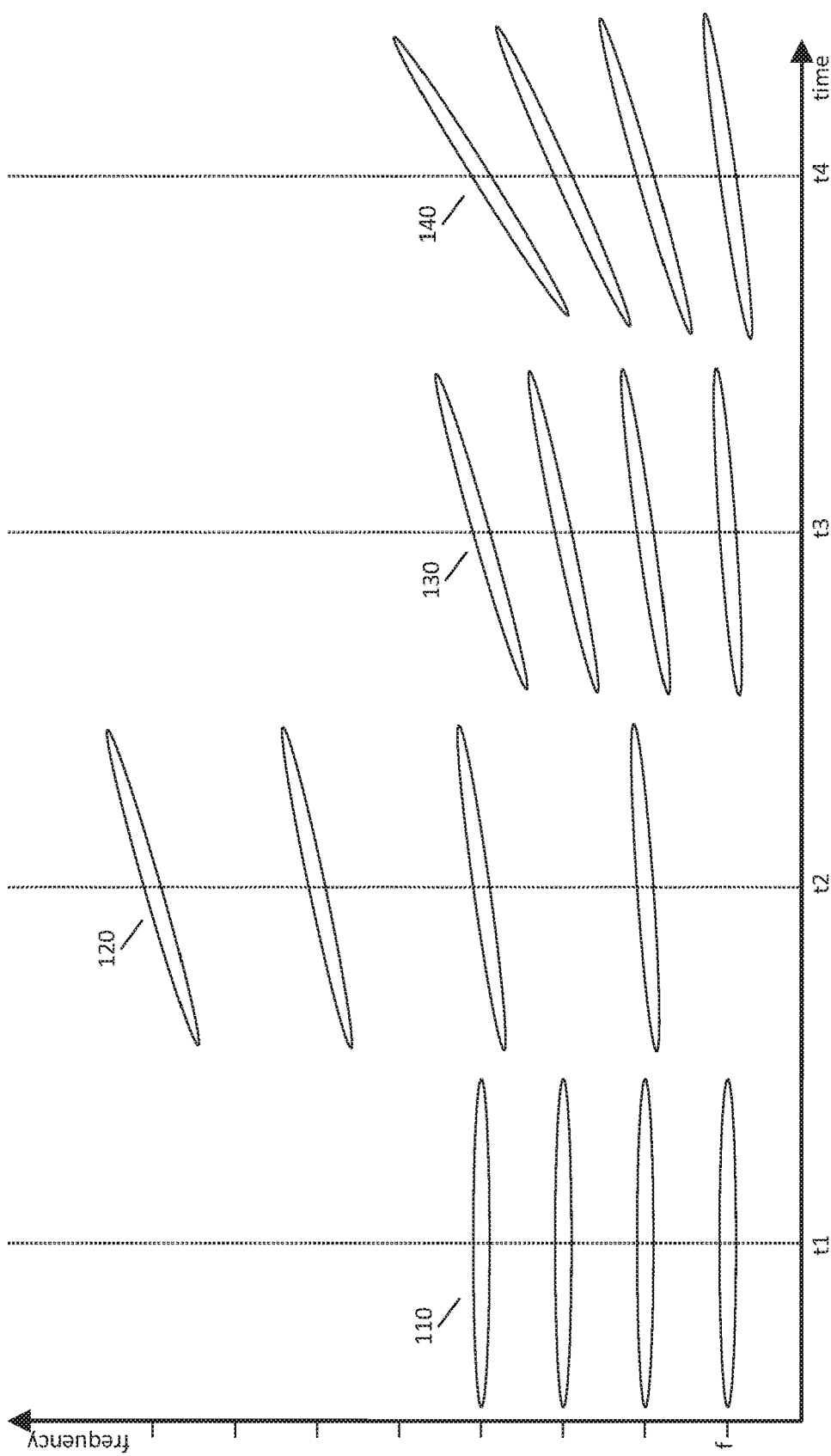
FIG. 1 illustrates examples of harmonic signals with different fractional chirp rates.

FIG. 1 illustrates examples of four harmonic signals with different fractional chirp rates as a function of time and frequency. FIG. 1 does not represent actual signals but provides a conceptual illustration of how chirplets (Gaussian signals with a specified time, frequency, chirp rate, and duration) would appear in a time-frequency representation, such as a spectrogram.

Harmonic signal 110 is centered at a time t1 and has four harmonics. The first harmonic has a frequency of f, and the second, third, and fourth harmonics have frequencies of 2f, 3f, and 4f, respectively. Each of the harmonics has a chirp rate of 0 since the frequency of the harmonics is not changing over time. Accordingly, the fractional chirp rate of harmonic signal 110 is 0.

Harmonic signal 120 is centered at time t2 and has four harmonics. The first harmonic has a frequency of 2f and the second, third, and fourth harmonics have frequencies of 4f, 6f, and 8f, respectively. The first harmonic has a chirp rate of c that is positive since the frequency is increasing over time. The second, third, and fourth harmonics have chirp rates of 2c, 3c, and 4c, respectively. Accordingly, the fractional chirp rate of harmonic signal 120 is c/2f.

Harmonic signal 130 is centered at time t3 and has four harmonics. The first harmonic has a frequency of f, and the second, third, and fourth harmonics have frequencies of 2f, 3f, and 4f, respectively. The first harmonic also has a chirp rate of c, and the second, third, and fourth harmonics have chirp rates of 2c, 3c, and 4c, respectively. Accordingly, the fractional chirp rate of harmonic signal 130 is c/f, which is twice that of harmonic signal 120.

Harmonic signal 140 is centered at time t4 and has four harmonics. The first harmonic has a frequency of f, and the second, third, and fourth harmonics have frequencies of 2f, 3f, and 4f, respectively. The first harmonic has a chirp rate of 2c as the rate of change of frequency is double that of harmonic signal 130. The second, third, and fourth harmonics have chirp rates of 4c, 6c, and 8c, respectively. Accordingly, the fractional chirp rate of harmonic signal 140 is 2c/f, which is twice that of harmonic signal 130.

Figure 2:
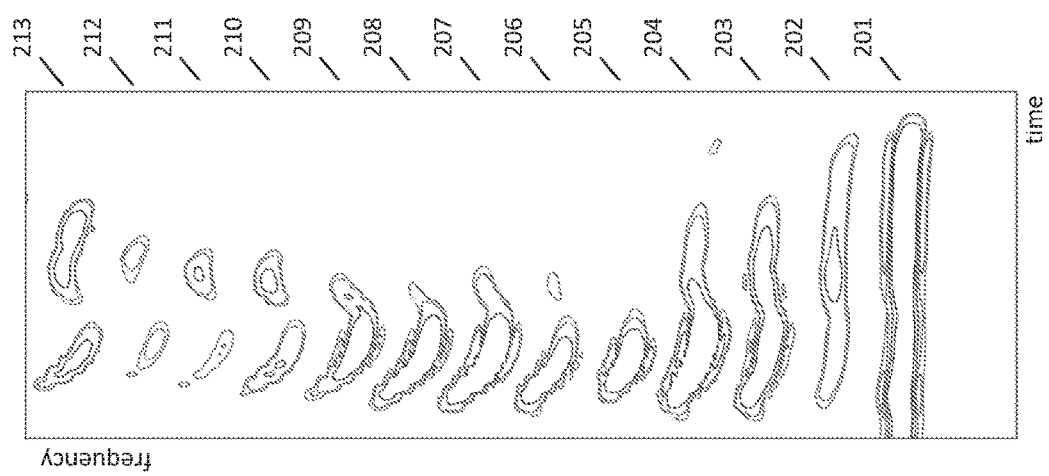
FIG. 2 is a spectrogram of a portion of a speech signal.

FIG. 2 is a contour plot of a spectrogram of a portion of a speech signal. In the spectrogram, multiple harmonics 201-213 are indicated. In FIG. 2, the first harmonic 201 is the fundamental frequency and the frequency of the first harmonic 201 is the pitch of the signal. The second harmonic 202 is at twice the frequency of the first harmonic 201, the third harmonic 203 is at three times the frequency of the first harmonic 201, and so forth. Some harmonics are less prominent in FIG. 2. For example, the eleventh harmonic 211 and the twelfth harmonic 212 have significantly lower amplitudes than the other harmonics.

In some implementations, the pitch of a time-varying signal may be estimated using an estimated fractional chirp rate of the signal. The signal may be processed by obtaining frames from the signal, and then processing the frames. For example, the frames may be windowed 50 millisecond portions of the signal at 10 millisecond intervals. A fractional chirp may be estimated for each of the frames, and the estimated fractional chirp rates may then be used to estimate a pitch for each of the frames.

Any appropriate techniques may be used to estimate the fractional chirp rate of a frame of the signal, such as any of the techniques described in U.S. patent application publication 2016/0232924 filed on Dec. 15, 2015, which is incorporated by reference herein in its entirety for all purposes. For example, the fractional chirp rate of a frame may be estimated by using one or more of a frequency-chirp distribution, a pitch-velocity transform, or a generalized spectrum.

In some implementations, the fractional chirp rate of a frame may be estimated using a pitch-velocity transform (PVT) of the frame. A PVT may be computed using inner products as $$P(f,\chi) = \langle x, \psi(f,\chi f) \rangle$$

where x is the frame and $\psi(f, c)$ is a function parameterized by frequency f and chirp rate c. In some implementations, $\psi(f, c)$ may represent a chirplet, such as $$\psi(f, c) = \frac{1}{\sqrt{2\pi\sigma^2}} e^{-\frac{1}{2}\left(\frac{t-t_0}{\sigma}\right)^2 + f(t-t_0)i + \frac{c}{2}(t-t_0)^2 i}$$

where σ corresponds to a duration or spread of the chirplet and $t_0$ is a location of the chirplet in time. To compute a distribution of frequency and chirp rate, one can select an appropriate function $\psi(f, c)$, such as a chirplet, and compute $P(f, \chi)$ for multiple values of f and χ. A PVT is not limited to the above example, and may be computed in other ways. For example, a PVT may be computed as the real part, imaginary part, magnitude, or magnitude squared of an inner product, may be computed using measures of similarity other than an inner product, or may be computed using non-linear functions of the frame.

The PVT for a specified value of a fractional chirp rate is a function of frequency and may be considered to be a spectrum or a generalized spectrum of the frame. Accordingly, for each value of a fractional chirp rate, a generalized spectrum may be determined from the PVT that is associated with a particular fractional chirp rate. The generalized spectra may be referred to as $X_\chi(f)$. As described below, these generalized spectra need not be computed from a PVT and may be computed in other ways. The PVT for a specified fractional chirp rate corresponds to a slice of the PVT, which will be referred to herein as a row of the PVT (if the PVT was presented in a different orientation, this could also be referred to as a column and the orientation of the PVT is not a limiting feature of the techniques described herein). For clarity of explanation, a chirplet will be used for the function $\psi(\ )$ in the following discussion, but any appropriate function may be used for $\psi(\ )$.

For a fractional chirp rate of 0, the PVT corresponds to $$P(f,0) = \langle x, \psi(f,0) \rangle$$

which corresponds to an inner product of the frame with a Gaussian where the Gaussian has a chirp rate of zero and is modulated to the corresponding frequency f of the PVT. This may be the same as computing a short-time Fourier transform of the frame with a Gaussian window.

For a non-zero fractional chirp rate, the PVT corresponds to an inner product of the frame with a Gaussian where the chirp rate of the Gaussian increases as the frequency of the Gaussian increases. In particular, the chirp rate may be the product of the fractional chirp rate and the frequency. For non-zero chirp rates, the PVT may have an effect similar to slowing down or reducing the fractional chirp rate of the frame (or conversely, speeding up or increasing the fractional chirp rate of the frame). Accordingly, each row of the PVT corresponds to a generalized spectrum where the fractional chirp rate of the frame has been modified by a value corresponding to the row of the PVT.

When the fractional chirp rate of the generalized spectrum (or row of the PVT) is equal to the fractional chirp rate of the frame, the generalized spectrum may correspond to removing the fractional chirp rate of the frame and the generalized spectrum for this value of the fractional chirp rate may be referred to as a stationary spectrum of the frame or a "best" row of the PVT.

Figure 3:
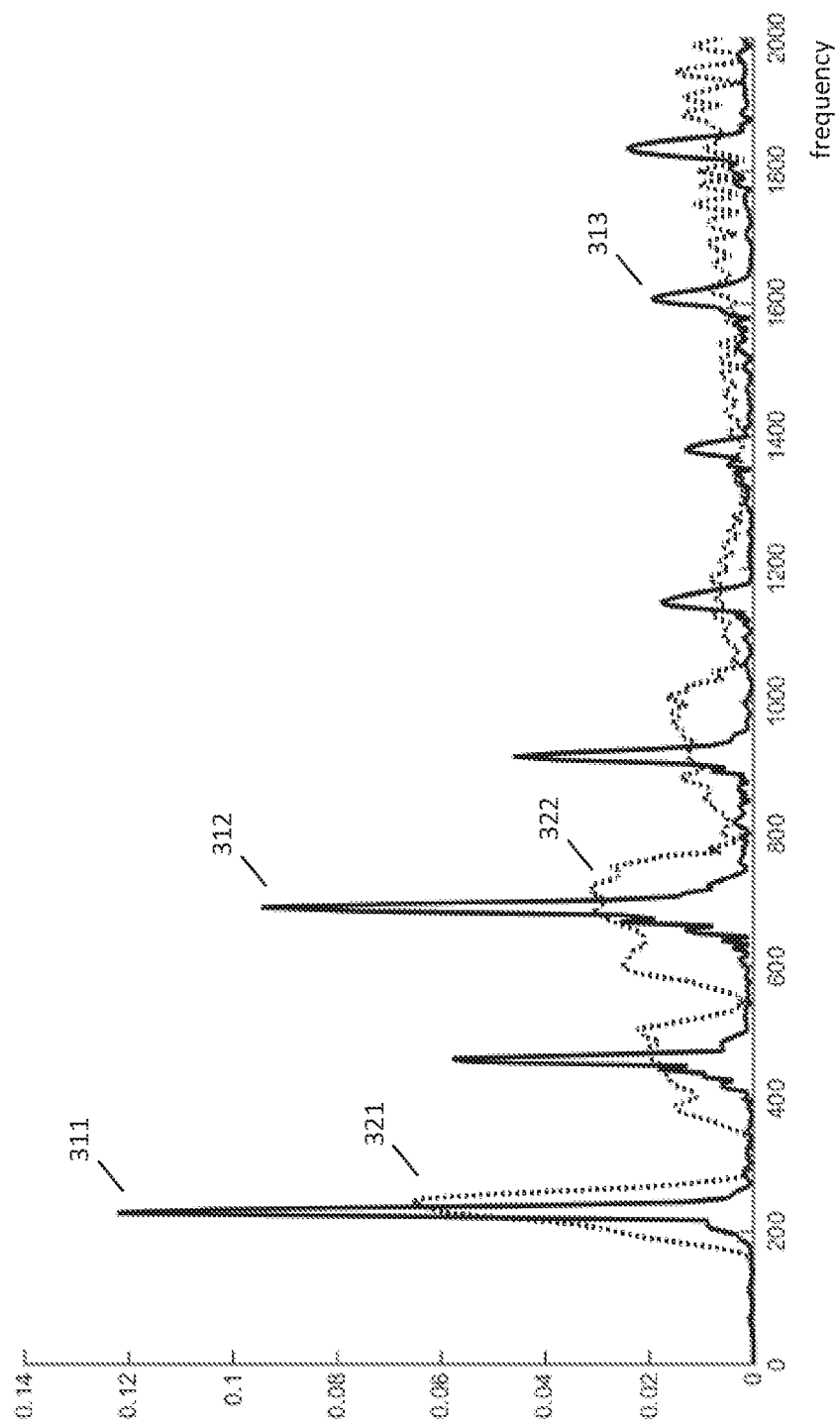
FIG. 3 illustrates two generalized spectra of a speech signal for two different values of fractional chirp rate.

FIG. 3 illustrates two generalized spectra of a frame for two different fractional chirp rates. The solid line corresponds to a generalized spectrum where the fractional chirp rate matches the fractional chirp rate of the frame or the stationary spectrum. The dashed line corresponds to a generalized spectrum with a fractional chirp of zero, which will be referred to as the zero generalized spectrum (and may correspond to a short-time Fourier transform of the frame). The peaks of the stationary spectrum are higher and narrower than the peaks of the zero generalized spectrum. For the first harmonic, the peak 311 of the stationary spectrum is about twice the height and one-third the width of peak 321 of the zero generalized spectrum. For the third harmonic, the difference between the peak 312 of the stationary spectrum and peak 322 of the zero generalized spectrum is even greater. For the seventh harmonic, the peak 313 of the stationary spectrum is clearly visible, but the peak of the zero generalized spectrum is not visible.

The features of different generalized spectra (or rows of the PVT) may be used to determine a fractional chirp rate of the frame. As noted above, the peaks of the generalized spectrum may be narrower and higher for the correct value of the fractional chirp rate. Techniques for measuring narrower and higher peaks of a spectrum may thus be used for estimating the fractional chirp rate of a frame.

To estimate fractional chirp rate for a frame, a function may be used that takes a vector (e.g., a spectrum of the frame) as input and outputs one or more scores according to some criteria. Let g( ) be a function that takes a vector as input (such as a row of a PVT of the frame) and outputs a one or more values or scores corresponding to the input. In some implementations, the output of g( ) may be a number that indicates a peakiness of the input. For example, g( ) may correspond to entropy, Fisher information, Kullback-Leibler divergence, or a magnitude of the input to a fourth or higher power. Using the function g( ) the fractional chirp rate of a frame may be estimated from the PVT using the following:

$$\hat{\chi} = \underset{\chi}{\operatorname{argmax}} g(P(f, \chi))$$

where $\hat{\chi}$ is an estimate of the fractional chirp rate. The function g( ) may be computed for multiple rows of the PVT, and the row producing the highest value of g( ) may be selected as corresponding to an estimated fractional chirp rate of the frame.

The estimate of the fractional chirp rate may also be computed from a generalized spectrum:

$$\hat{\chi} = \underset{\chi}{\operatorname{argmax}} g(X_\chi(f))$$

The estimate of the fractional chirp rate may also be computed using inner products of the frame with the function $\psi( )$:

$$\hat{\chi} = \underset{\chi}{\operatorname{argmax}} g(\langle x, \psi(f, \chi f) \rangle)$$

As described above, the PVT and the generalized spectrum may be computed using a variety of techniques. In some implementations, these quantities may be determined by computing an inner product of a frame with a chirplet, but the techniques described herein are not limited to that particular implementation. For example, functions other than chirplets may be used and measures of similarity other than an inner product may be used In some implementations, a spectrum may be modified before being used to determine the fractional chirp rate of the frame. For example, a log likelihood ratio (LLR) spectrum may be computed from a spectrum, such as a stationary spectrum or generalized spectrum, and the LLR spectrum may be denoted as $LLR_\chi(f)$. An LLR spectrum may use hypothesis testing techniques to improve a determination of whether a harmonic is present at a frequency of a spectrum.

For example, to determine whether a harmonic is present at the frequencies of the stationary spectrum shown in FIG. 3, one could compare the value of the spectrum to a threshold. Using an LLR spectrum may improve this determination.

An LLR spectrum may be computed using a log likelihood ratio of two hypotheses: (1) a harmonic is present at a frequency of the frame, and (2) a harmonic is not present at a frequency of the frame. For each of the two hypotheses, a likelihood may be computed. The two likelihoods may be compared to determine whether a harmonic is present, such as by computing a ratio of the logs of the two likelihoods.

In some implementations, the log likelihood for a harmonic being present at a frequency of the frame may be computed by fitting a Gaussian to the spectrum at the frequency and then computing a residual sum of squares between the Gaussian and the spectrum. To fit a Gaussian to a spectrum at a frequency, the Gaussian may be centered at the frequency, and then an amplitude of the Gaussian may be computed using any suitable techniques. In some implementations, a spread in frequency or duration of the Gaussian may match a window used to compute the spectrum or the spread of the Gaussian may also be determined during the fitting process. For example, when fitting a Gaussian to peak 311 of the stationary spectrum in FIG. 3, the amplitude of the Gaussian may be approximately 0.12 and the duration of the Gaussian may correspond approximately to the duration of the peak (or the window used to compute the spectrum). The log likelihood may then be computed by computing a residual sum of squares between the Gaussian and the spectrum in a window around the frequency for which the likelihood is being computed.

In some implementations, the log likelihood for a harmonic not being present at a frequency may correspond to computing a residual sum of squares between a zero spectrum (a spectrum that is zero at all frequencies) and the spectrum in a window around the frequency for which the likelihood is being computed.

The LLR spectrum may be determined by computing the two likelihoods for each frequency of the spectrum (such as a stationary or generalized spectrum) and then computing a logarithm (e.g., natural logarithm) of the ratio of the two likelihoods. Other steps may be performed as well, such as estimating a noise variance in the frame and using the estimated noise variance to normalize the log likelihoods. In some implementations, an LLR spectrum for a frequency f may be computed as $$LLR(f) = \frac{1}{2\sigma_{noise}^2} \left( X^h X - (X - \hat{G}_f)^h (X - \hat{G}_f) \right)$$

where $\sigma_{noise}^2$ is an estimated noise variance, X is a spectrum, h is a Hermitian transpose, and $\hat{G}_f$ is a best fitting Gaussian to the spectrum at frequency f.

Figure 4:
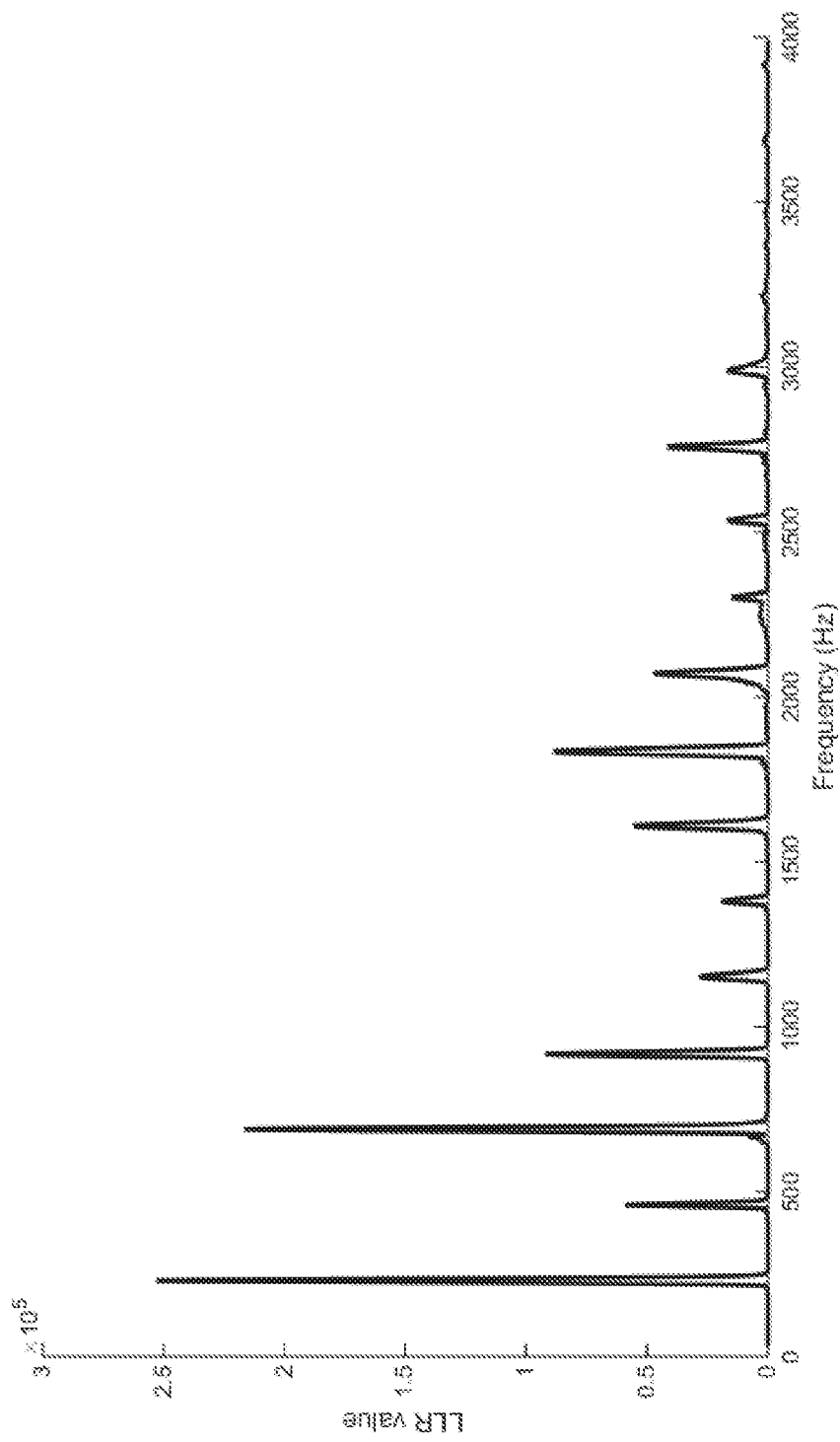
FIG. 4 illustrates a log-likelihood ratio (LLR) spectrum of a speech signal.

FIG. 4 illustrates an example of an LLR spectrum. For each frequency, the LLR spectrum has a high value where a harmonic is present and a low value when a harmonic is not present. The LLR spectrum may provide a better determination than other spectra (such as a generalized or stationary spectra) of whether harmonics are present at different frequencies.

The estimate of the fractional chirp rate may also be computed using the LLR spectrum of the generalized spectrum:

$$\hat{\chi} = \underset{\chi}{\mathrm{argmax}}\, g(LLR_\chi(f))$$

To illustrate some possible implementations of estimating fractional chirp rate, examples of the function g( ) will be provided. The examples below will use the generalized spectrum, but other spectra, such as the LLR spectrum (or LLR spectrum of a generalized spectrum) may be used as well.

In some implementations, the fractional chirp rate may be estimated using a magnitude to the fourth power of the generalized spectrum:

$$g(X_\chi(f)) = \int |X_\chi(f)|^4 df$$

In some implementations, the function g( ) may comprise at least some of the following sequence of operations: (1) compute $|X_\chi(f)|^2$ (may be normalized by dividing by the total energy of the frame or some other normalization value); (2) compute an auto-correlation of $|X_\chi(f)|^2$ denoted as $r_x(\tau)$; and (3) compute the Fisher information, entropy, Kullback-Leibler divergence, sum of squared (or magnitude squared) values of $r_x(\tau)$, or a sum of squared second derivatives of $r_x(\tau)$. The foregoing examples are not limiting and other variations are possible. For example, in step (1), $X_\chi(f)$ or its magnitude, or real or imaginary parts may be used in place of $|X_\chi(f)|^2$.

Accordingly, the fractional chirp rate of a frame may be determined using any combinations of the above techniques or any similar techniques known to one of skill in the art.

The techniques described above may be applied to determine an estimated fractional chirp rate for each frame of the signal. For example, where there are N frames, the estimated fractional chirp rates for the frames may be denoted as $\hat{\chi}_1 \ldots \hat{\chi}_N$.

The estimated fractional chirp rates for the frames may be used to estimate a pitch for each of the frames using the relationship between pitch and fractional chirp rate. For continuous-time signals, the relationship between the fractional chirp rate is:

$$\chi(t) = \frac{\dot{\phi}(t)}{\phi(t)} = \frac{d(\log \phi(t))}{dt}$$

where $\phi(t)$ is the pitch of a signal and $\dot{\phi}(t)$ is the time-derivative of the pitch. Integrating both sides of this equation gives:

$$\log \phi(t) = \log \phi(t_0) + \int_{t_0}^{t} \chi(t) dt$$

$$\phi(t) = \phi(t_0) e^{\int_{t_0}^{t} \chi(t) dt}$$

where $t_0$ corresponds to the time of the first estimate of fractional chirp rate.

The above equation can be rewritten as:

$$\phi(t) = Kf(t)$$

where $K = \phi(t_0)$ is an unknown parameter to be estimated and $$f(t) = e^{\int_{t_0}^{t} \chi(t) dt}$$

is a function that can be determined from the estimated fractional chirp rates.

The above can be implemented in discrete time as follows:

$$\hat{\phi}_n = Kf_n$$

$$f_n = e^{\sum_{i=1}^{n} T \hat{\chi}_i} \quad (1)$$

where $\hat{\phi}_n$ is an estimated pitch for the $n^{th}$ frame, $\hat{\chi}_n$ is an estimated fractional chirp rate for the $n^{th}$ frame, and T is a time difference between frames. Since $f_n$ can be determined from the estimated fractional chirp rates, an estimate of the pitch for each of the frames may be determined by determining a value for K. In the following, K is referred to as a scale factor and $f_n$ for n from 1 to N is referred to as a pitch template.

Above, the pitch template is computed starting at the beginning of the sequence of frames. In some implementations, the pitch template may be computed starting from the end of the sequence of frames and the estimated fractional chirp rates may be subtracted. In some implementations, the pitch template may be computed starting from the middle of the sequence of frames, and estimated fractional chirp rates after the starting point may be added and estimated fractional chirp rates before the starting point may be subtracted.

Now described are techniques for estimating the scale factor K to obtain a pitch estimate for the frames using the pitch template. The scale factor K may be determined by using peak-to-peak distances in frequency representations of the frames. Before describing how to compute the scale factor K using peak-to-peak distances of all the frames, techniques will be described for determining the pitch of a single frame using peak-to-peak distances in a frequency representation of that frame. Any appropriate techniques may be used to estimate a pitch using peak-to-peak distances, such as any of the techniques described in U.S. patent application publication 2016/0232924.

A pitch estimate of a frame may be determined by computing peak-to-peak distances of a frequency representation of the frame, such as a stationary spectrum or an LLR spectrum. For clarity in the following explanation, the LLR spectrum will be used as an example frequency representation, but the techniques described herein are not limited to the LLR spectrum and any appropriate frequency representation may be used.

When computing peak-to-peak distances in a frequency representation of a frame, it may not always be clear which peaks correspond to signal and which peaks correspond to noise. Including too many peaks that correspond to noise or excluding too many peaks that correspond to signal may reduce the accuracy of the pitch estimate. Although the example LLR spectrum in FIG. 8 has low noise, for signals with higher noise levels, additional peaks caused by noise may be more significant.

Figure 5A:
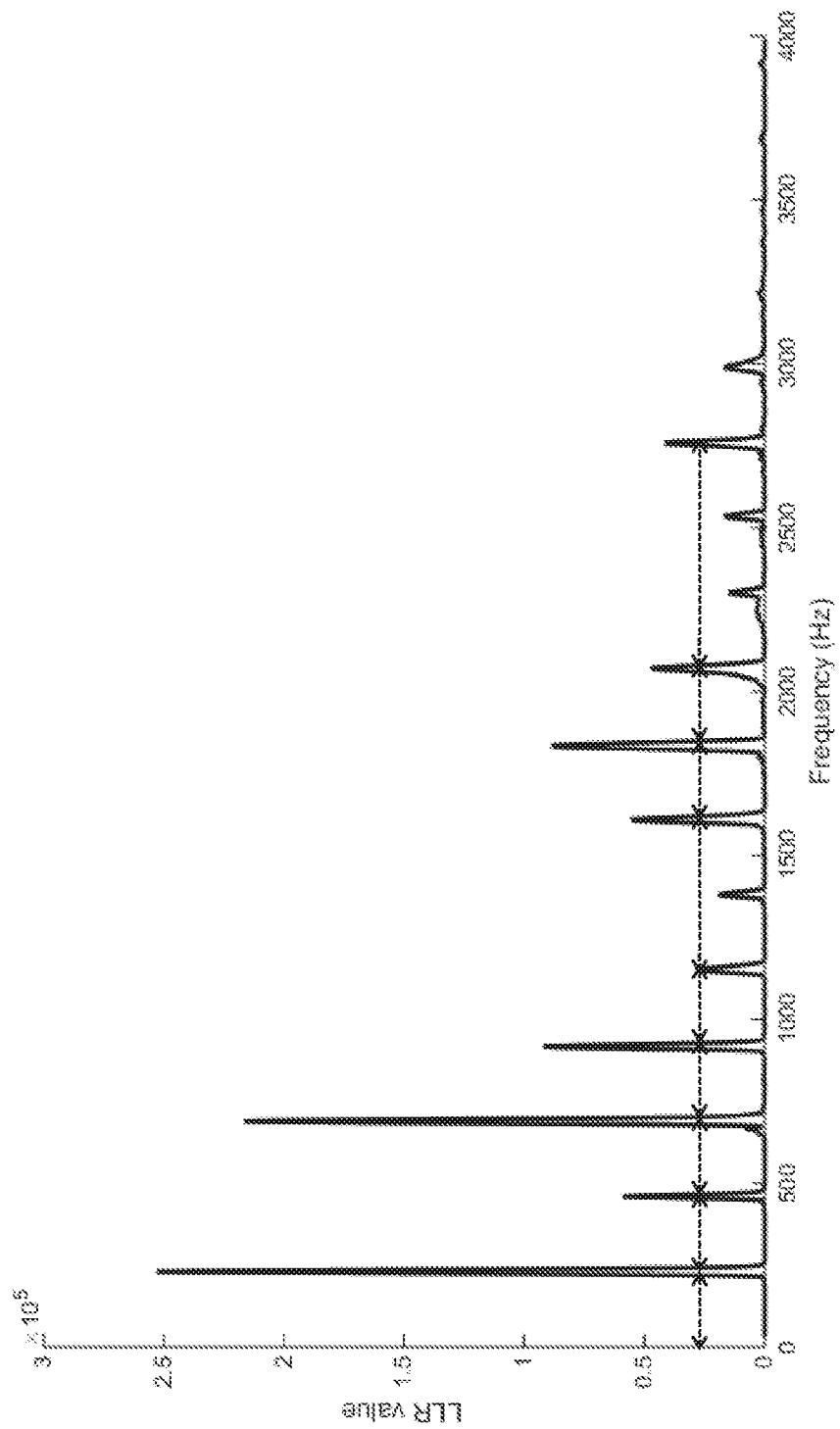
FIG. 5A illustrates peak-to-peak distances for a single threshold in an LLR spectrum of a speech signal.

In some implementations, peaks may be selected from the LLR spectrum using thresholds. For example, a standard deviation (or variance) of the noise in the signal may be determined and a threshold may be computed or selected using the standard deviation of the noise, such as setting the threshold to a multiple or fraction of the standard deviation (e.g., set a threshold to twice the standard deviation of the noise). After choosing a threshold, peak-to-peak distances may be determined. For example, FIG. 5A shows peak-to-peak distances for a threshold of approximately 0.3. At this threshold, the first 5 peak-to-peak distances are about 230 Hz, the sixth is about 460 Hz, the seventh and eighth are about 230 Hz, and the ninth is about 690 Hz. After determining the peak-to-peak distances, a most frequently occurring peak-to-peak distance may be selected as the pitch estimate. For example, a histogram may be computed with bins with a width of 2-5 Hz, and the histogram bin with the largest number of counts may be selected as the pitch estimate.

In some implementations, multiple thresholds may be used as illustrated in FIG. 5B. For example, thresholds may be selected using the heights of the peaks in the LLR spectrum, such as the ten highest peaks or all peaks above another threshold (e.g., above twice the standard deviation of the noise). Peak-to-peak distances may be computed for each of the thresholds. In FIG. 5B, peak-to-peak distance 501 is determined using the tallest peak as a threshold, peak-to-peak distances 511 and 512 are determined using the second tallest peak as a threshold, peak-to-peak distances 521, 522, and 523 are determined using the third tallest peak as a threshold, and so forth. As above, a most frequently occurring peak-to-peak distance may be selected as the pitch estimate, for example, by using a histogram.

In some implementations, peak-to-peak distances may be computed for multiple frames for determining a pitch estimate. For example, to determine a pitch estimate for a particular frame, peak-to-peak distances may be computed for the current frame, five previous frames, and five subsequent frames. The peak-to-peak distances for all of the frames may be pooled together in determining a pitch estimate, such as computing a histogram for all of the peak-to-peak distances.

In some implementations, peak-to-peak distances may by computed using different smoothing kernels on the spectrum. Applying a smoothing kernel to a spectrum may reduce peaks caused by noise but may also reduce peaks caused by signal. For noisy signals, a wider kernel may perform better and, for less noisy signals, a narrower kernel may perform better. It may not be known how to select an appropriate kernel width, and thus peak-to-peak distances may be computed from a spectrum for each of a specified group of kernel widths. As above, the peak-to-peak distances for all of the smoothing kernels may be pooled together in determining a pitch estimate.

Accordingly, peak-to-peak distances may be computed in a variety of ways including, but not limited to, different thresholds, different frames, and different smoothing kernels. From these peak-to-peak distances, a pitch estimate for a frame may be determined. In some implementations, a pitch estimate may be determined as the frequency corresponding to the mode of the histogram for all computed peak-to-peak distances.

In some implementations, a pitch estimate for a frame may be determined by estimating a cumulative distribution function (CDF) and/or a probability density function (PDF) of the peak-to-peak distances instead of using a histogram. For example, a CDF for pitch may be estimated as follows. For any pitch values smaller than the smallest peak-to-peak distance, the CDF will be zero and for any pitch values larger than the largest peak-to-peak distance, the CDF will be one. For a pitch value in between these two bounds, the CDF may be estimated as the cumulative number of peak-to-peak distances smaller than the pitch value divided by the total number of peak-to-peak distances. For example, consider the peak-to-peak distances illustrated in FIG. 5A. FIG. 5A shows a total of 9 peak-to-peak distances, including 7 peak-to-peak distances of 230 Hz, 1 peak-to-peak distance of 460 Hz, and 1 peak-to-peak distance of 690 Hz. A CDF may be estimated as having a value of 0 for frequencies less that 230 Hz, a value of 7/9 for frequencies between 230 Hz and 460 Hz, a value 8/9 for frequencies between 460 Hz and 690 Hz, and a value of 1 for frequencies above 690 Hz.

This estimated CDF may resemble a step function, and accordingly the CDF may be smoothed using any appropriate smoothing technique, such as spline interpolation, low-pass filtering, or LOWESS smoothing. The pitch estimate may be determined as the pitch value corresponding to the largest slope of the CDF.

In some implementations, a PDF may be estimated from the CDF by computing a derivative of the CDF and any appropriate techniques may be used for computing the derivative. The pitch estimate may then be determined as the pitch value corresponding to the peak of the PDF.

In some implementations, multiple preliminary pitch estimates may be determined, and an actual pitch estimate may be determined using the preliminary pitch estimates. For example, an average of the preliminary pitch estimates or a most common pitch estimate may be selected as the actual pitch estimate. For example, a pitch estimate may be computed for each of a group of threshold values. For high threshold values, the pitch estimate may be too high, and for low threshold values, the pitch estimate may be too low. For thresholds in between, the pitch estimate may be more accurate. To determine an actual pitch estimate, a histogram may be computed of the multiple preliminary pitch estimates, and the actual pitch estimate may correspond to the frequency of the mode of the histogram. In some implementations, outliers may be removed from the histogram to improve the actual pitch estimate.

The above techniques used peak-to-peak distances to estimate the pitch for a single frame. Peak-to-peak distances may also be used to estimate the scale factor K and accordingly to obtain a pitch estimate for each of the N frames using the pitch template as described above.

Figure 6:
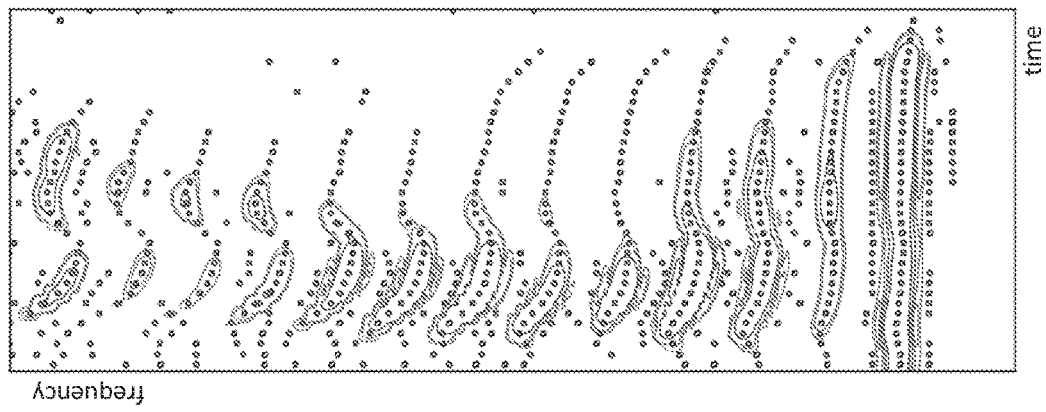
FIG. 6 is a spectrogram of a portion of a speech signal showing locations of peaks in the frequency representations.

For each of the N frames of the harmonic signal, a frequency representation may be computed, and peaks may be identified in each of the frequency representations using any of the techniques described above. FIG. 6 illustrates peaks for each of the frames in the spectrogram of the speech signal of FIG. 2. In FIG. 6, each peak is represented by a small circle. Many of the peaks lie on the harmonics of the signal and represent peaks corresponding to the signal itself (e.g., a person's speech). Some of the peaks do not lie on the harmonics (such as the peaks below the first harmonic) and these peaks may correspond to noise in the signal.

Figure 7B:
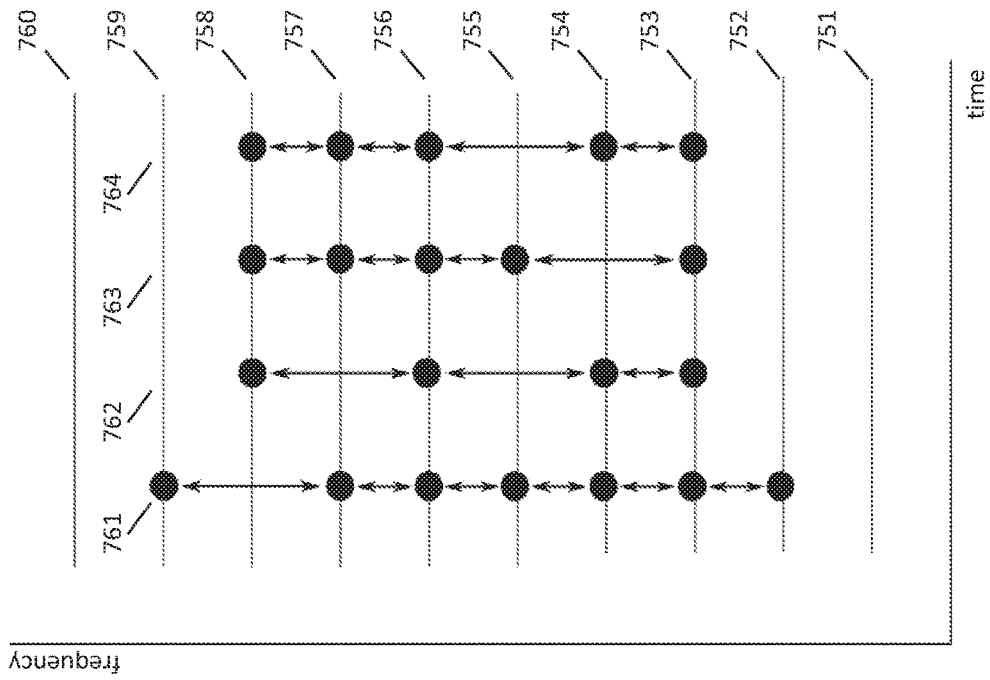
FIGS. 7A and 7B illustrate peaks in frequency representations of frames before and after scaling the frequency locations of the peaks.
Figure 7A:
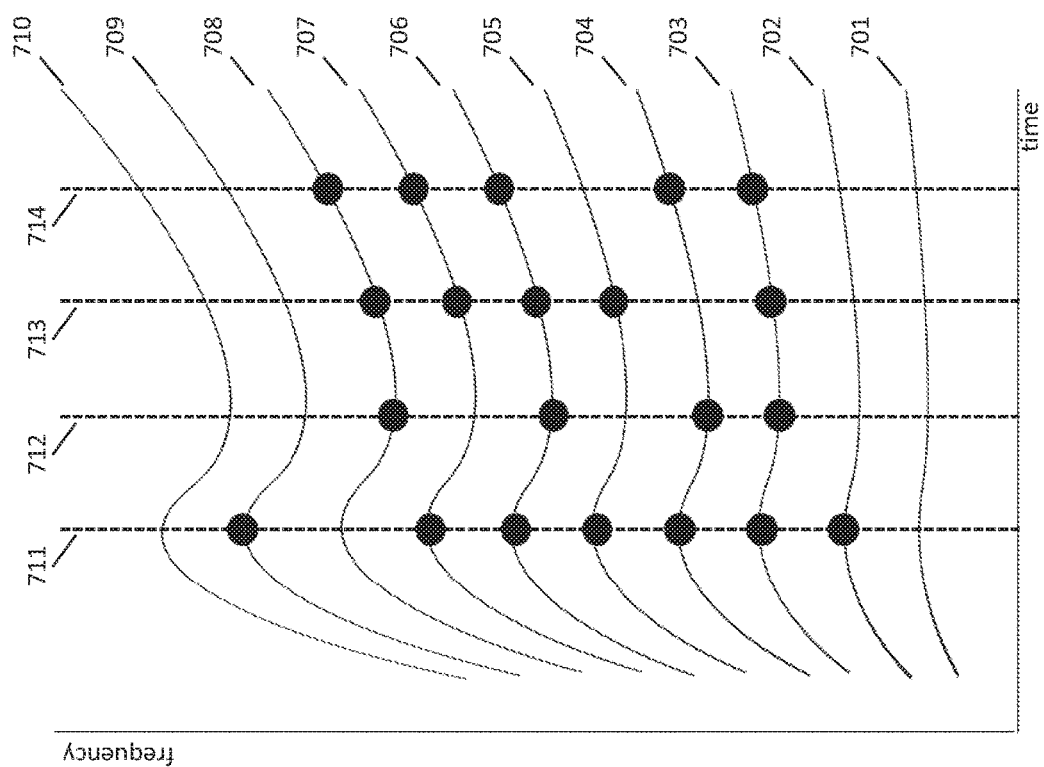

For clarity of explanation, FIG. 7A represents a simplified time-frequency representation of a speech signal. In FIG. 7A, the first ten harmonics 701-710 are indicated by the solid lines. The times for four frames 711-714 of the signal are indicated by the vertical dashed lines. For the first frame 711, a frequency representation may be computed and peaks in the frequency representation may be identified using any of the techniques described above. In this example, seven peaks were identified as indicated by the black circles indicated on the line for the first frame. Similarly, frequency representations may be computed for each of the other frames, and peaks may be identified in the frequency representations as indicated by the other black circles in FIG. 7A.

For a first frame, the peak-to-peak distances in the frame may be used to estimate the pitch of the first frame as described above. Where the pitch changes slowly over time, the peak-to-peak distances in adjacent frames may be used as well because the peak-to-peak distances in adjacent frames will be similar to the peak-to-peak distances of the first frame. Where it is desired, however, to estimate pitch for a large number of frames, the pitch can vary significantly over the course of the frames, and peak-to-peak distances may have significant variation for frames that are not adjacent to one another. Accordingly, the entire ensemble of peak-to-peak distances for all of the frames may not be used together to estimate the pitch for all of the frames using the techniques described above for estimating the pitch of a single frame.

The pitch template described above does, however, allow for the estimation of the pitch for all of the frames using all of the available peak-to-peak distances. The pitch template allows this because the pitch template is created from the fractional chirp rate estimates which indicate how the pitch is changing over time. Because the change in pitch over time has been estimated (even though the pitch is not yet known), the estimated changes in pitch can be used to normalize the peak-to-peak distances across time. By normalizing the peak-to-peak distances, the peak-to-peak distances can all describe the same pitch (such as the pitch of the first frame), and accordingly all the peak-to-peak distances may be used to estimate that one pitch. That one pitch estimate can be used to estimate the scale factor K, and the scale factor K may be used along with the pitch template to compute a pitch estimate for each of the frames.

In some implementations, the peaks of FIG. 7A may be normalized by dividing the locations in frequency of the peaks by the pitch template. For example, the frequency locations of the peaks for the first frame may be divided by the pitch template for the first frame, the frequency locations of the peaks for the second frame may be divided by the pitch template for the second frame, and so forth. FIG. 7B illustrates the locations in time and frequency of the peaks of FIG. 7A after they have been normalized. In FIG. 7B, the normalized locations of the first ten harmonics are represented using the solid lines 751-760. Because the normalization has essentially removed the variation of the pitch over time, the peaks are aligned across horizontal lines in frequency.

The normalized peak locations now correspond to the same pitch value, corresponding to the scale factor K, and may be used together to estimate that pitch value using the techniques described above. For example, peak-to-peak distances may be computed, and the pitch value may be estimated using a histogram or estimating a cumulative distribution function.

For example, for frame 761 in FIG. 7B, there are five peak-to-peak distances that are approximately K and one that is approximately 2K. For frame 762, there is one peak-to-peak distance that is approximately K and two that are approximately 2K. For frame 763, there are three peak-to-peak distances that are approximately K and one that is approximately 2K. For frame 764, there are three peak-to-peak distances that are approximately K and one that is approximately 2K. Overall, there are 12 peak-to-peak distances that are approximately K and 5 that are approximately 2K. Accordingly, K is the most common peak-to-peak distance.

Once K has been estimated, the pitch for each of the frames may be determined by multiplying the pitch template (computed from the estimated fractional chirp rates for the frames) by the scale factor K, as indicated by equation (1) above.

Variations of the above techniques are possible. For example, to estimate the scale factor K from the ensemble peak-to-peak distances, a k-nearest neighbors technique may be used to estimate a probability density function for the peak-to-peak distances. The probability density function may be estimated as $$f_x(x) = \frac{k}{2R_x P}$$

where P is the number of peak-to-peak distances and $R_x$ is the distance to the $k^{th}$ nearest neighbor of x. In some implementations, k may be chosen to be proportional to the number of peak-to-peak distances, and/or the density may be smoothed by convolving it with a Gaussian kernel. The scale factor K may be estimated as the mode of the estimated probability density function.

In some implementations, the density may be combined with a prior probability distribution (also referred to herein as a "prior") for the scale factor K. For example, peak-to-peak distances from one or more other portions of speech of the same speaker may be used to create a prior, such as a prior modeled by a Gaussian distribution where the mean and variance of the Gaussian are determined by the other portions of speech. The estimated probability density function above may be multiplied by the prior when estimating the scale factor K.

In some implementations, the estimate for the scale factor K may be improved using optimization techniques, such as gradient descent or golden-section search. The scale factor K and the pitch template may be used to create a model for the signal and this signal model may be compared with the actual signal to obtain the error between the two. Optimization techniques may be used to adjust the value of the scale factor K to minimize the error between the signal model and the signal.

The above techniques provide an accurate estimation of pitch for each of the frames, and these pitch estimates may be used for any appropriate applications. For example, where the signal is a speech signal, the estimated pitch for the frames may be used for speech recognition, word spotting, speaker recognition, speaker verification, noise reduction, or signal reconstruction.

For some applications, a more accurate pitch estimate may be desired, and the pitch estimate may be improved by modeling the pitch with a parametric function, such as a polynomial. The above pitch estimate (or any other pitch estimate) may provide an initial pitch estimate that may be improved by fitting a parametric function to the pitch of the signal.

In some implementations, the pitch may be modeled as a polynomial of order d:

$$\phi(n) = \alpha_0 + \alpha_1 n + \alpha_2 n^2 + \ldots + \alpha_d n^d$$

where d may take any appropriate value or be determined experimentally. Because each harmonic is a multiple of the pitch, the frequencies of each harmonic may be represented as $$f_L(n) = L(\alpha_0 + \alpha_1 n + \alpha_2 n^2 + \ldots + \alpha_d n^d)$$

where L is the number of the harmonic and $f_L(n)$ is the frequency of the $L^{th}$ harmonic at the $n^{th}$ frame. Because of the relationship of the frequencies of the harmonics (each being a multiple of the pitch) the data of multiple harmonics may be used simultaneously to determine the coefficients of the polynomial.

Regression may be used to fit a parametric function to the harmonics of the signal. In performing the regression, the independent variable may be time, such as an index number of the frames in the sequence of frames, and the dependent variable may be the frequency of the harmonics. The data for performing the regression may be obtained from frequency representations of the frames, such as any of the frequency representations described above. In some implementations, peaks in the frequency representations of a frame may considered to correspond to a harmonic and the location in frequency of the peak and a time of the frame (e.g., index number) may be used to fit the parametric function.

A previous pitch estimate for the frames, such as the pitch estimates described above, may be used to determine locations of peaks in the frequency representations of the frames for performing linear regression. For example, it may be assumed that the initial pitch estimate has certain level of accuracy, and accordingly that the true pitch estimate may be within a certain range of the initial pitch estimate, such as that the true pitch estimate is within 20% of the initial pitch estimate or within 30 Hz of the initial pitch estimate. These assumptions may also be applied to individual harmonics, such as that the true frequency of each harmonic is within 20% of the initial estimate of the harmonic (as determined by a multiple of the pitch estimate) or within 30 Hz of the initial estimate of the harmonic.

Figure 8:
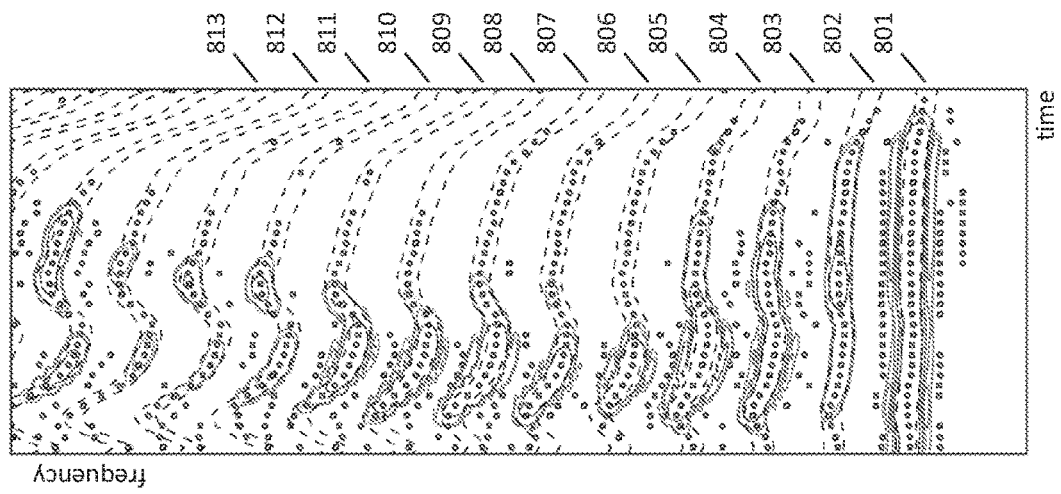
FIG. 8 is a spectrogram of a portion of a speech signal showing locations of peaks in the frequency representations and windows for selecting peaks.

FIG. 8 illustrates example frequency windows that may be used to identify peaks in the frequency representations of the frames based on an initial pitch estimate. Window 801, indicated by the dashed lines, is an example window for the first harmonic where, for each frame, the center of the window corresponds to the initial pitch estimate and the width of the window is a specified parameter. Window 802 is an example window for the second harmonic, where, for each frame, the center of the window corresponds to twice the initial pitch estimate and the width of the window is a specified parameter. Similarly, windows 803-813 are shown for harmonics up to the thirteenth harmonic. Although the windows shown here each have the same width, in some implementations, the windows for different harmonics may have different widths.

These windows may be used to identify peaks in the frequency representations of each frame for performing linear regression. The peaks in the frequency representations of the frames may be identified using any appropriate techniques, such as any of the techniques described above. In FIG. 8, the peaks in the frequency representations of the frames are indicated by the circles. The peaks within windows 801-813 likely correspond to the actual harmonics of the signal and the peaks outside windows 801-813, such as the peaks below window 801, likely correspond to noise in the signal.

In some implementations, data for performing the linear regression may be obtained as follows: (i) obtain an initial estimate of pitch for each of the frames, such as the pitch estimate described above; (ii) identify peaks in the frequency representations of the frames, such as using any of the techniques described above, (iii) determine a window for each harmonic of each frame where the center of the window corresponds to an initial frequency estimate for the harmonic (determined from the pitch estimate), and (iv) select peaks from the frequency representations of the frames where the frequency of the peak is within one of the windows. Each peak may be denoted as $(n_j, f_j, h_j)$ for j from 1 to P, where $n_j$ is the number of the frame, $f_j$ is the location in frequency of the peak, $h_j$ is the number of the harmonic, and P is the total number of peaks within the frequency windows for all of the harmonics and all of the frames. The data $(n_j, f_j, h_j)$ for j from 1 to P will be referred to herein as the peak data.

In some implementations, the peak data may be used in a single regression operation to determine the parameters of the parametric function (e.g., the polynomial coefficients). The peak data may be modified by dividing the frequency of each peak by the harmonic number of the peak. After performing this modification of the peak data, the modified frequencies should all be close to the true pitch of the signal (since the frequency of a harmonic is approximately a multiple of the pitch), and the modified peak data may be used to determine the parameters of the parametric function that models the pitch, such as by performing a regression. Any appropriate regression techniques may be used, such as linear regression using least squares estimation. In some implementations, this process may be repeated to further improve the pitch estimate. For example, a first pitch estimate may be used to find peaks that are used to obtain a second pitch estimate using regression. Then the second pitch estimate may be used to find peaks that are used to obtain a third pitch estimate using regression, and so forth.

In some implementations, the peak data may be used in a single regression operation, but a weighted regression may be used to differently weight the peak data for different harmonics. Because each harmonic is a multiple of the pitch, the data corresponding to higher harmonics may have a higher variance than data corresponding to lower harmonics. Accordingly, providing a higher weight to the peak data for the higher harmonics may provide a more accurate regression result. For example, the peak data for each harmonic may be weighted by the harmonic number such that the data for the first harmonic has a weight of 1, the data for the second harmonic has a weight of 2, and so forth. Any appropriate weighted regression techniques may be used, such as weighted least squares or weighted linear least squares.

In some implementations, multiple regression operations may be performed where each regression operation uses a different portion of the peak data. For example, a first regression operation may be performed using the peak data for the first harmonic to obtain a first pitch estimate. The first pitch estimate may be used to update the windows and accordingly to update the peak data since the updated windows may give rise to a different selection of peaks than the previous windows. A second regression operation may then be performed using the peak data for the first harmonic and the second harmonic to obtain a second pitch estimate. This process may be repeated for a desired number of harmonics to obtain a final pitch estimate for each of the frames.

In some implementations, the previous pitch estimate may be used as data for fitting the parametric function even though there may not be peaks at those locations in the frequency representations. For example, for a first frame, the peak data may be supplemented with a peak for the first harmonic corresponding to the previous pitch estimate for the first frame and/or with peaks for other harmonics corresponding to multiples of the previous pitch estimate for the first frame. Supplementing the peak data with peaks obtained from the previous pitch estimate may improve the robustness of the fitting process.

After the parameters of the parametric function have been determined, a pitch estimate may be obtained by computing values of the parametric function using the estimated parameters. For example, a pitch estimate for the first frame may be obtained by computing a value of the parametric function at a time corresponding to the first frame.

In some implementations, after estimating a pitch for each of the frames, it may be desired to compute other features of the frames, such as estimated amplitudes of harmonics for each of the frames. After the pitch has been estimated, the locations of each of the harmonics are known, and accordingly the amplitudes of the harmonics may be obtained from the frequency representations of the frames. The amplitudes of the harmonics for a frame may be estimated using any appropriate techniques.

In some implementations, the harmonic amplitudes may be computed by modeling the harmonics with chirplets. An individual harmonic may be modeled as a chirplet, where the frequency and chirp rate of the chirplet are set using the estimated pitch and estimate fractional chirp rate for the frame. For example, for the $k^{th}$ harmonic of a first frame, the frequency of the harmonic may be k times the estimated pitch, and the chirp rate of the harmonic may be the fractional chirp rate times the frequency of the chirplet. Any appropriate duration may be used for the chirplet.

In some implementations, the harmonic amplitudes may be estimated using maximum likelihood estimation. For example, a vector of harmonic amplitudes, â, may be estimated as $$\hat{a} = (MM^h)^{-1} Mx$$

where M is a matrix where each row corresponds to a chirplet for each harmonic with parameters as described above, the number of rows of the matrix M corresponds to the number of harmonic amplitudes to be estimated, h is a Hermitian transpose, and x is a time series representation of the frame. The estimate of the harmonic amplitudes may be complex valued, and in some implementations, other functions of the amplitudes may be used, such as a magnitude, magnitude squared, real part, or imaginary part.

In some implementations, the harmonic amplitudes may have been computed in previous steps and need not be explicitly computed again. For example, where an LLR spectrum is used in previous processing steps, the harmonic amplitudes may be computed in computing the LLR spectrum. The LLR spectrum is computed by fitting Gaussians to a spectrum, and one fitting parameter of the Gaussian is the amplitude of the Gaussian. The amplitudes of the Gaussians may be saved during the process of computing the LLR spectrum, and these amplitudes may be recalled instead of being recomputed. In some implementations, the harmonic amplitudes determined from the LLR spectrum may be a starting point, and the harmonic amplitudes may be refined, for example, by using optimization techniques.

For each frame of the signal, a fractional chirp rate, pitch, and harmonic amplitudes may be determined. Some or all of the fractional chirp rate, pitch, and harmonic amplitudes may be referred to as HAM (harmonic amplitude matrix) features and a feature vector may be created that comprises the HAM features. The feature vector of HAM features may be used in addition to or in place of any other features that are used for processing harmonic signals. For example, the HAM features may be used in addition to or in place of mel-frequency cepstral coefficients, perceptual linear prediction features, or neural network features. The HAM features may be applied to any application of harmonic signals, including but not limited to performing speech recognition, word spotting, speaker recognition, speaker verification, noise reduction, or signal reconstruction.

Figure 10:
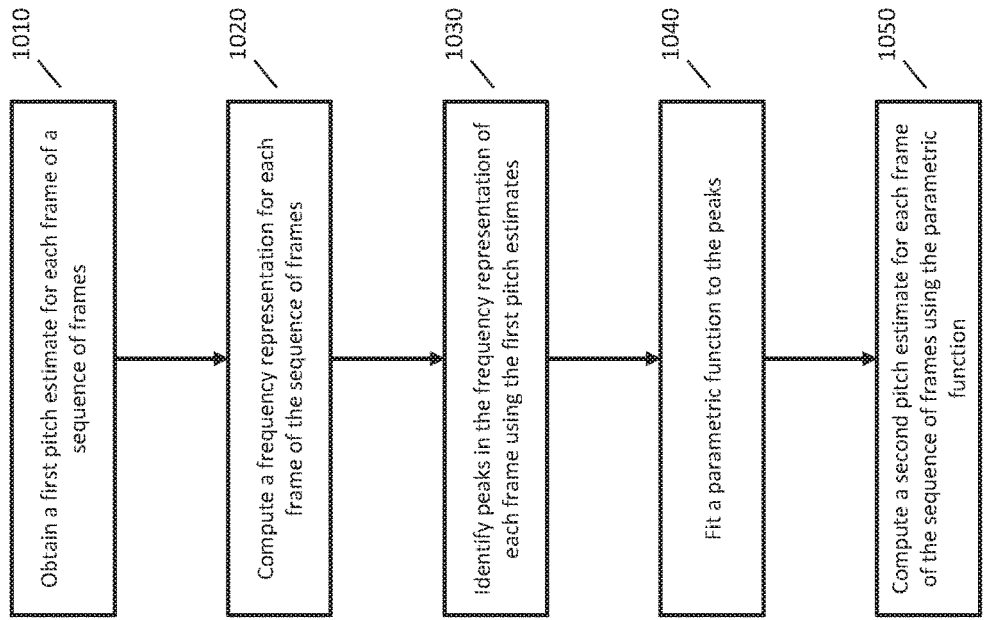
FIG. 10 is a flowchart showing an example implementation of a process for computing more accurate pitch estimates for a sequence of frames given initial pitch estimates for the sequence of frames.
Figure 9:
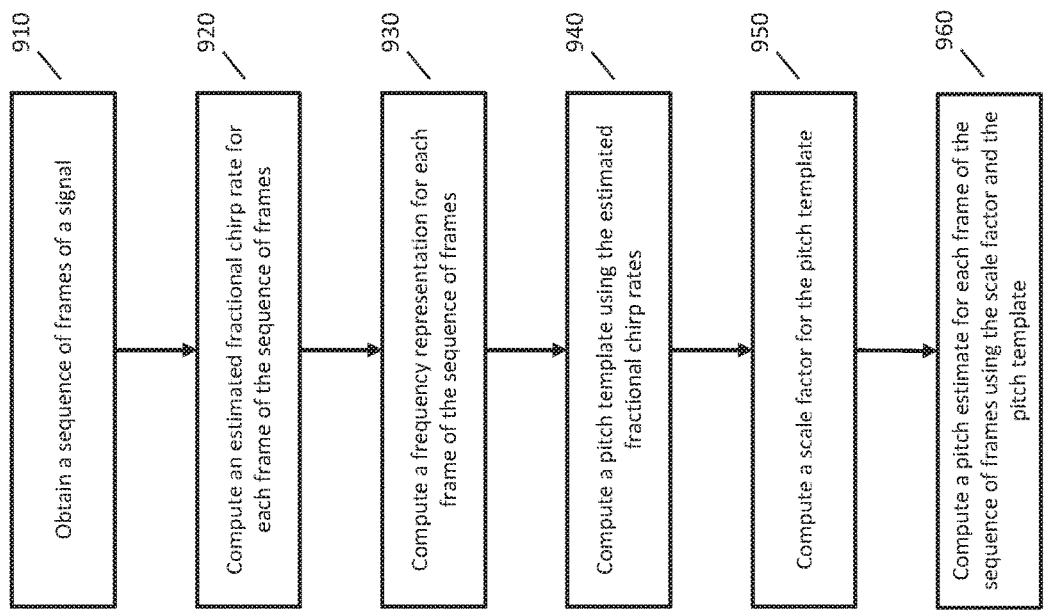
FIG. 9 is a flowchart showing an example implementation of a process for computing pitch estimates for a sequence of frames.

FIGS. 9 and 10 are flowcharts illustrating example implementations of the processes described above. Note that, for the flowcharts described below, the ordering of the steps is exemplary and that other orders are possible, not all steps are required and, in some implementations, some steps may be omitted or other steps may be added. The processes of the flowcharts may be implemented, for example, by one or more computers, such as the computers described below.

FIG. 9 is a flowchart showing an example implementation of a process for estimating a pitch for each frame of a sequence of frames. At step 910, a sequence of frames of a signal is obtained. The signal may be any harmonic signal, such as a speech signal. Each frame may include a portion of the signal, such as a sequence of consecutive digital samples of the signal. The frames may have any appropriate length (and need not all be the same length), and the frames may or may not overlap with one another. For example, the frames may be spaced at 10 millisecond intervals and be 50 milliseconds long.

At step 920, a fractional chirp rate is estimated for each frame of the sequence of frames. The fractional chirp rate may be estimated using any of the techniques described above. For example, a plurality of possible fractional chirp rates may be identified and a score may be computed for each of the possible fractional chirp rates. A score may be computed using a function, such as any of the functions g( ) described above. The estimate of the fractional chirp rate may be determined by selecting a fractional chirp rate corresponding to a highest score. The function g( ) may take as input any frequency representation of a frame as described above, including but not limited to a spectrum of a frame, an LLR spectrum of a frame, a generalized spectrum of a frame, or a PVT of a frame.

At step 930, a frequency representation is computed for each frame of the sequence of frames. The frequency representation of a frame may be any representation of the frame as a function of frequency. The frequency representation may be, for example, a stationary spectrum, a generalized spectrum, an LLR spectrum, or a row of a PVT. The frequency representations may be computed during the processing of step 920 and need not be a separate step. For example, the frequency representations may be computed during other processing that determines an estimate of the fractional chirp rate.

At step 940, a pitch template is computed using the estimated fractional chirp rates. The pitch template may be any sequence of values that may be computed by performing sums of one or more of the estimated fractional chirp rates, such as the pitch template described above. For example, the pitch template for the first frame may be computed as $f_1 = e^{T\hat{\chi}_1}$, the pitch template for the second frame may be computed as $f_2 = e^{T(\hat{\chi}_1 + \hat{\chi}_2)}$, the pitch template for the third frame may be computed as $f_3 = e^{T(\hat{\chi}_1 + \hat{\chi}_2 + \hat{\chi}_3)}$, and so forth. The pitch template may not be close in value to the actual pitches of the frames, but the pitch template may be used to estimate the pitches as described above.

At step 950, a scale factor is computed for the pitch template. The scale factor may be computed in any appropriate way such that the product of the scale factor with the pitch template provides a pitch estimate for each frame of the sequence of frames. In some implementations, the scale factor may be estimated by identifying frequency locations of peaks in the frequency representations of the frames (e.g., as described below in step 1030 with reference to the process illustrated in FIG. 10), computing scaled frequency locations by dividing the frequency location of a peak by the corresponding value of the pitch template, and then estimating the scale factor using peak-to-peak distances of the scaled frequency locations, as described above.

At step 960, a pitch estimate for each frame of the sequence of frames is computed by multiplying the scale factor by the pitch template. For example, a pitch estimate for the first frame may be computed by multiplying the scale factor by the pitch template for the first frame.

FIG. 10 is a flowchart showing an example implementation of a process for computing a more accurate pitch estimate for a sequence of frames given an initial pitch estimate for the sequence of frames. At step 1010, a first pitch estimate is obtained for each frame of the sequence of frames. The first pitch estimates may be computed using the process described in FIG. 9, or may be computed using any other appropriate techniques for estimating pitch.

At step 1020, a frequency representation is computed for each frame of the sequence of frames, and the frequency representations may be computed using any of the techniques described above. Where the first pitch estimates are computed using the process of FIG. 9, the frequency representations computed in step 1020 may be the same as those computed in 930 or they may be different frequency representations (e.g., step 930 may use a stationary spectrum and step 1020 may use an LLR spectrum).

At step 1030, peaks are identified in the frequency representations of the frames. The peaks may be identified using any appropriate techniques. For example, the values of the frequency representations may be compared to the threshold to identify a continuous portion of the frequency representation (each a frequency portion) that is always above the threshold. The peak may be identified, for example, by selecting a highest point of the frequency portion, selecting the mid-point between the beginning of the portion and the end of the frequency portion, or fitting a curve (such as a Gaussian) to the frequency portion and selecting the peak using the fit. The frequency representations may accordingly be processed to identify frequency portions that are above the threshold and identify a peak for each frequency portion.

At step 1040, a parametric function is fitted to the identified peaks using any of the techniques described above. For example, linear regression or weighted linear regression may be used to fit a polynomial to the identified peaks. The fitting of the parametric function to the identified peaks may determine values for the parameters of the parametric function.

At step 1050, a second pitch estimate for each frame of the sequence of frames is computed by determining a value of the parametric function for each frame of the sequence of frames using the parameters determined at step 1040.

The pitch estimate for the frames computed from either FIG. 9 or FIG. 10 may then be used for any appropriate signal processing task. For example, for a speech signal, the pitch estimates may be used for a wide variety of speech processing tasks, including but not limited to pitch tracking, word spotting, signal reconstruction, speech recognition, and speaker verification or recognition. In some implementations, the pitch estimates may be used to create a feature vector for each frame, such as a feature vector of harmonic amplitudes for each frame, and the feature vectors may be used for any appropriate signal processing tasks, such as the above speech processing tasks.

Figure 11:
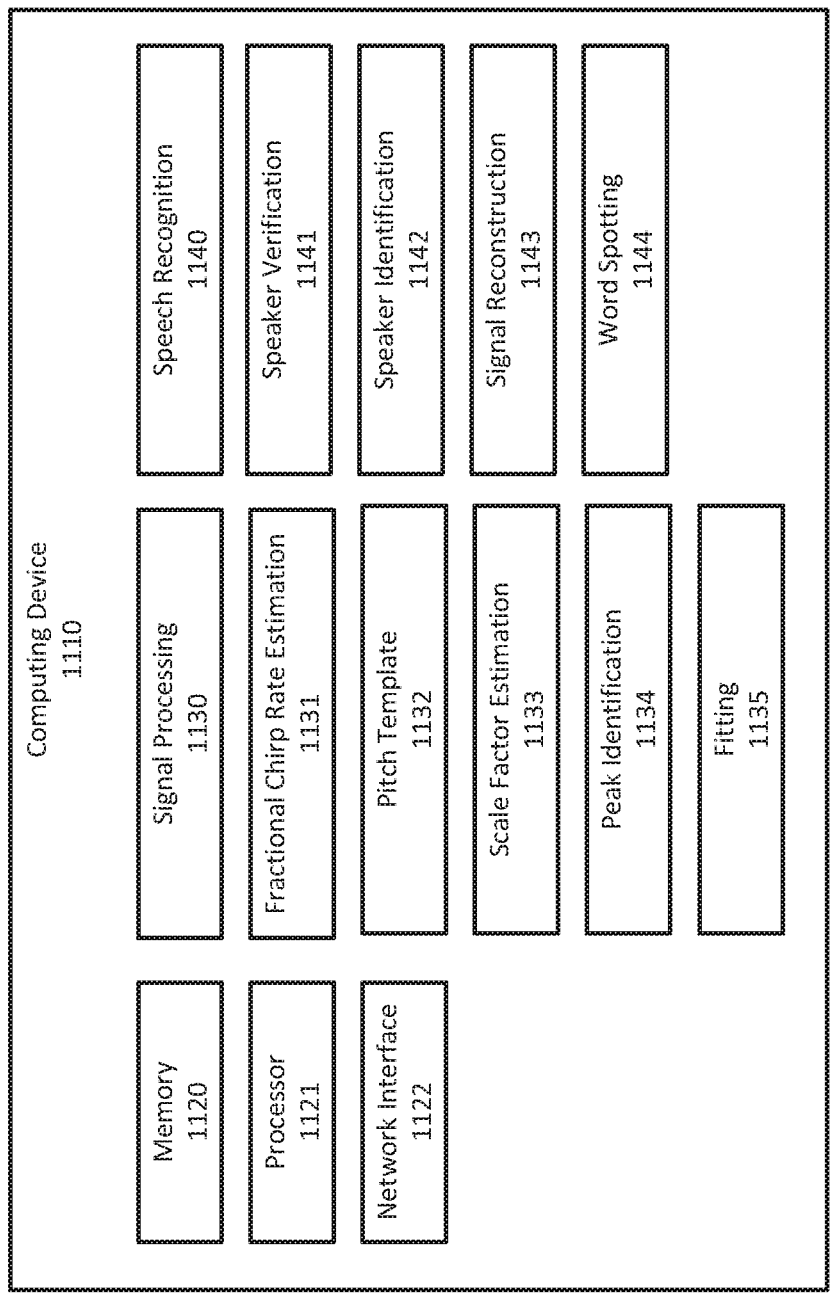
FIG. 11 is an exemplary computing device that may be used to compute pitch estimates for a sequence of frames.

FIG. 11 illustrates components of one implementation of a computing device 1110 for implementing any of the techniques described above. In FIG. 11, the components are shown as being on a single computing device 1110, but the components may be distributed among multiple computing devices, such as a system of computing devices, including, for example, an end-user computing device (e.g., a smart phone or a tablet) and/or a server computing device (e.g., cloud computing). For example, the collection of audio data and pre-processing of the audio data may be performed by an end-user computing device and other operations may be performed by a server.

Computing device 1110 may include any components typical of a computing device, such as volatile or nonvolatile memory 1120, one or more processors 1121, and one or more network interfaces 1122. Computing device 1110 may also include any input and output components, such as displays, keyboards, and touch screens. Computing device 1110 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1110 may have a signal processing component 1130 for performing any needed operations on an input signal, such as analog-to-digital conversion, encoding, decoding, subsampling, windowing, or computing frequency representations. Computing device 1110 may have a fractional chirp rate estimation component 1131 that estimates fractional chirp rate of a signal using any of the techniques described above. Computing device 1110 may have a pitch template component 1132 that computes a pitch template using estimated fractional chirp rates as described above. Computing device 1110 may have a scale factor estimation component 1133 that computes a scale factor for the pitch template as described above. Computing device 1110 may have a peak identification component 1134 that identifies peaks in a frequency representation as described above. Computing device 1110 may have a fitting component 1135 that fits a parametric function to peaks of frequency representations as described above.

Computing device 1110 may also have components for applying the above techniques to particular applications. For example, computing device 1110 may have any of a speech recognition component 1140, a speaker verification component 1141, a speaker recognition component 1142, a signal reconstruction component 1143, and a word spotting component 1144. For example, the pitch estimates for the sequence of frames or feature vectors computed using the pitch estimates may be used as input to any of the applications and used in addition to or in place of other features or parameters used for these applications. In some implementations, one or more of the components 1130-1135 and/or 1140-1144 may be implemented using one or more processors 1121. Examples of the processor 1121 can include a microprocessor, a digital signal processor (DSP), a microcontroller, or special purpose processors configured to execute speech processing applications.

Depending on the implementation, steps of any of the techniques described above may be performed in a different sequence, may be combined, may be split into multiple steps, or may not be performed at all. The steps may be performed by a general purpose computer, may be performed by a computer specialized for a particular application, may be performed by a single computer or processor, may be performed by multiple computers or processers, may be performed sequentially, or may be performed simultaneously.

The techniques described above may be implemented in hardware, in software, or a combination of hardware and software. The choice of implementing any portion of the above techniques in hardware or software may depend on the requirements of a particular implementation. A software module or program code may reside in volatile memory, non-volatile memory, RAM, flash memory, ROM, EPROM, or any other form of a non-transitory computer-readable storage medium.

Conditional language used herein, such as, "can," "could," "might," "may," "e.g.," is intended to convey that certain implementations include, while other implementations do not include, certain features, elements and/or steps. Thus, such conditional language indicates that that features, elements and/or steps are not required for some implementations. The terms "comprising," "including," "having," and the like are synonymous, used in an open-ended fashion, and do not exclude additional elements, features, acts, operations. The term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood to convey that an item, term, etc. may be either X, Y or Z, or a combination thereof. Thus, such conjunctive language is not intended to imply that certain embodiments require at least one of X, at least one of Y and at least one of Z to each be present.

While the above detailed description has shown, described and pointed out novel features as applied to various implementations, it can be understood that various omissions, substitutions and changes in the form and details of the devices or techniques illustrated may be made without departing from the spirit of the disclosure. The scope of inventions disclosed herein is indicated by the appended claims rather than by the foregoing description. All changes which come within the meaning and range of equivalency of the claims are to be embraced within their scope.

What is claimed is:

1. A computer-implemented method for estimating a time-varying pitch of a speech signal, the method comprising:
    obtaining a sequence of frames from the speech signal, wherein each frame comprises a portion of the speech signal and wherein each frame corresponds to a time;
    computing an estimated fractional chirp rate for each frame of the sequence of frames;
    computing a frequency representation for each frame of the sequence of frames;
    computing a pitch template for the sequence of frames by computing sums of the estimated fractional chirp rates;
    computing a scale factor for the pitch template using frequency locations of peaks in the frequency representation;
    computing a first pitch estimate for each frame of the sequence of frames using the scale factor and the pitch template, wherein the first pitch estimate for a frame is a product of the scale factor and the pitch template for the frame;
    identifying peaks in the frequency representations using the first pitch estimates;
    fitting a parametric function to the peaks in the frequency representations;
    computing second pitch estimates using the parametric function; and
    processing the speech signal using the second pitch estimates.

2. The method of claim 1, wherein each frame of the sequence of frames is obtained by applying a sliding window to the speech signal.

3. The method of claim 1, wherein the pitch template for a first frame is equal to the estimated fractional chirp rate for the first frame, and wherein the pitch template for a second frame is equal to a sum of the estimated fractional chirp rate for the first frame and the estimated fractional chirp rate for the second frame.

4. The method of claim 1, wherein the parametric function is a polynomial.

5. The method of claim 1, wherein identifying the peaks in the frequency representations using the first pitch estimates comprises:
    for a first frame, identifying peaks in windows centered at multiples of the first pitch estimate for the first frame; and
    for a second frame, identifying peaks in windows centered at multiples of the first pitch estimate for the second frame.

6. The method of claim 5, wherein the windows for the first frame all have the same width.

7. The method of claim 1, comprising computing a feature vector for each frame of the sequence of frames using the second pitch estimates and performing at least one of speech recognition, speaker verification, speaker identification, or signal reconstruction using the feature vectors.

8. A system for estimating a time-varying pitch of a speech signal, the system comprising:
    one or more computing devices comprising at least one processor and at least one memory, the one or more computing devices configured to:
        obtain a sequence of frames from the speech signal, wherein each frame comprises a portion of the speech signal and wherein each frame corresponds to a time;
        compute an estimated fractional chirp rate for each frame of the sequence of frames;
        compute a frequency representation for each frame of the sequence of frames;
        compute a pitch template for the sequence of frames by computing sums of the estimated fractional chirp rates;
        compute a scale factor for the pitch template using frequency locations of peaks in the frequency representations;
        compute a scale factor for the pitch template using frequency locations of peaks in the frequency representations;
        compute a first pitch estimate for each frame of the sequence of frames using the scale factor and the pitch template, wherein the first pitch estimate for a frame is a product of the scale factor and the pitch template for the frame;
        identify peaks in the frequency representations using the first pitch estimates;
        fit a parametric function to the peaks in the frequency representation;
        compute second pitch estimates using the parametric function; and
        process the speech signal using the second pitch estimates.

9. The system of claim 8, wherein the one or more computing devices configured to compute the scale factor by:
    determining frequency locations of peaks in the frequency representation for each frame of the sequence of frames;
    computing scaled frequency locations for each frame of the sequence of frames by dividing the frequency locations of the peaks for a frame by the pitch template for the frame; and
    computing the scale factor using the scaled frequency locations.

10. The system of claim 9, wherein the one or more computing devices configured to compute the scale factor by:

determining scaled peak-to-peak distances for each frame of the sequence of frames by computing a difference of scaled frequencies of adjacent peaks; and computing the scale factor using the scaled peak-to-peak distances.

11. The system of claim 10, wherein the one or more computing devices configured to compute the scale factor by:

estimating a distribution of the scaled peak-to-peak distances; and computing the scale factor using a mode of the distribution.

12. The system of claim 11, wherein estimating the distribution comprises using a k-nearest neighbors technique.

13. The system of claim 10, wherein estimating a distribution comprises using a prior for the scale factor.

14. The system of claim 8, wherein the frequency representation for a first frame comprises a stationary spectrum or a log-likelihood ratio spectrum.

15. One or more non-transitory computer-readable media comprising computer executable instructions that, when executed, cause at least one processor to perform actions comprising:

obtaining a sequence of frames from a speech signal, wherein each frame comprises a portion of the speech signal and wherein each frame corresponds to a time;

computing an estimated fractional chirp rate for each frame of the sequence of frames;

computing a frequency representation for each frame of the sequence of frames;

computing a pitch template for the sequence of frames by computing sums of the estimated fractional chirp rates;

computing a scale factor for the pitch template using frequency locations of peaks in the frequency representations;

computing a first pitch estimate for each frame of the sequence of frames using the scale factor and the pitch template, wherein the first pitch estimate for a frame is a product of the scale factor and the pitch template for the frame;

identifying peaks in the frequency representations using the first pitch estimates;

fitting a parametric function to the peaks in the frequency representations;

computing second pitch estimates using the parametric function; and processing the speech signal using the second pitch estimates.

16. The one or more non-transitory computer-readable media of claim 15, wherein fitting a parametric function to the peaks in the frequency representations comprises performing a linear regression or a weighted linear regression.

17. The one or more non-transitory computer-readable media of claim 15, wherein fitting a parametric function to the peaks in the frequency representations comprises:

performing a first regression using peaks corresponding to a first harmonic; and performing a second regression using peaks corresponding to the first harmonic and a second harmonic.

18. The one or more non-transitory computer-readable media of claim 15, the actions comprising computing amplitudes of harmonics for each frame of the sequence of frames using the second pitch estimates.

19. The one or more non-transitory computer-readable media of claim 15, the actions comprising performing at least one of speech recognition, speaker verification, speaker identification, or signal reconstruction using the second pitch estimates.

20. The one or more non-transitory computer-readable media of claim 15, wherein computing the scale factor comprises:

determining frequency locations of peaks in the frequency representation for each frame of the sequence of frames;

computing scaled frequency locations for each frame of the sequence of frames by dividing the frequency locations of the peaks for a frame by the pitch template for the frame; and computing the scale factor using the scaled frequency locations.

* * * * *